US011510134B2

(12) United States Patent
Li et al.

(10) Patent No.: US 11,510,134 B2
(45) Date of Patent: Nov. 22, 2022

(54) METHOD AND NETWORK DEVICE FOR TERMINAL DEVICE POSITIONING WITH INTEGRATED ACCESS BACKHAUL

(71) Applicant: Telefonaktiebolaget LM Ericsson (publ), Stockholm (SE)

(72) Inventors: Tianyi Li, Shanghai (CN); Di Shu, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/297,503

(22) PCT Filed: Nov. 30, 2018

(86) PCT No.: PCT/CN2018/118609
§ 371 (c)(1),
(2) Date: May 27, 2021

(87) PCT Pub. No.: WO2020/107411
PCT Pub. Date: Jun. 4, 2020

(65) Prior Publication Data
US 2022/0007275 A1    Jan. 6, 2022

(51) Int. Cl.
*H04W 72/12*    (2009.01)
*H04W 48/00*    (2009.01)
(Continued)

(52) U.S. Cl.
CPC .......... *H04W 48/17* (2013.01); *H04L 5/0001* (2013.01); *H04W 72/048* (2013.01); *H04W 72/1231* (2013.01); *H04W 72/1284* (2013.01)

(58) Field of Classification Search
CPC .................................................. H04W 48/17
See application file for complete search history.

(56) References Cited

U.S. PATENT DOCUMENTS

| 2012/0134288 A1* | 5/2012 | Fang ................... G01S 5/12 370/252 |
| 2019/0116605 A1* | 4/2019 | Luo .................... H04B 7/024 |
| 2020/0145860 A1* | 5/2020 | Koskela .............. H04W 76/14 |

FOREIGN PATENT DOCUMENTS

| CN | 107197518 A | 9/2017 |
| CN | 107404757 A | 11/2017 |

OTHER PUBLICATIONS

International Search Report and Written Opinion of the International Searching Authority, PCT/CN2018/118609, dated Jul. 25, 2019, 9 pages.

(Continued)

*Primary Examiner* — Michael T Vu
(74) *Attorney, Agent, or Firm* — Christopher & Weisberg, P.A.

(57) ABSTRACT

The present disclosure provides a method in a network device. The method includes: obtaining a node configuration associated with a set of Transmitting/Receiving Points, TRPs; selecting, from the set of TRPs, one or more IAB TRPs associated with a terminal device based on the node configuration and similarity metrics between an initial position estimate and historical positioning results for the terminal device; and transmitting a measurement request to a serving TRP associated with the terminal device and each of the one or more IAB TRPs; receiving, from each of the serving TRP and at least one of the one or more IAB TRPs, a measurement report indicating a Timing Advance, TA, associated with that TRP and the terminal device.

16 Claims, 5 Drawing Sheets

(51) Int. Cl.
*H04L 5/00* (2006.01)
*H04W 72/04* (2009.01)

(56) References Cited

OTHER PUBLICATIONS

"Views on NR Positioning Techniques," 3GPP TSG RAN WG1 Meeting #95 (R1-1813386) Spokane, USA, Nov. 12-16, 2018, Agenda Item 7.2.10.3, Mitsubishi Electric, 6 pages.
"Physical layer design for NR IAB," 3GPP TSG RAN WG1 Meeting #94 (R1-1808101) Gothenburg, Sweden, Aug. 20-24, 2018, Agenda Item: 7.2.3.1, Huawei, HiSilicon, 14 pages.
3rd Generation Partnership Project; Technical Specification Group Radio Access Network; NR; Radio Resource Control (RRC) protocol specification (Release 15) 3GPP TS 38.331 V15.1.0 (Mar. 2018) 268 pages.
3rd Generation Partnership Project; Technical Specification Group Radio Access Network; NG-RAN; NR Positioning Protocol A (NRPPa) (Release 15) 3GPP TS 38.455 V15.0.0 (Jun. 2018) 60 pages.
EPO Communication with Supplementary European Search Report dated Jun. 7, 2022 for Patent Application No. 18941759.5, consisting of 6-pages.

\* cited by examiner

METHOD AND NETWORK DEVICE FOR TERMINAL DEVICE POSITIONING WITH INTEGRATED ACCESS BACKHAUL

CROSS REFERENCE TO RELATED APPLICATIONS

This application is a 35 U.S.C. § 371 national stage application of PCT International Application No. PCT/CN2018/118609 filed on Nov. 30, 2018, the disclosure and content of which is incorporated by reference herein in its entirety.

TECHNICAL FIELD

The present disclosure relates to communication technology, and more particularly, to a method and a network device for terminal device positioning with Integrated Access Backhaul (IAB).

BACKGROUND

One of the features supported by New Radio (NR) network deployment scenarios and applications is wireless backhaul and relay links, which enables flexible and very dense deployment of NR cells without the need for increasing the density of the transport network proportionately.

Figure 1:
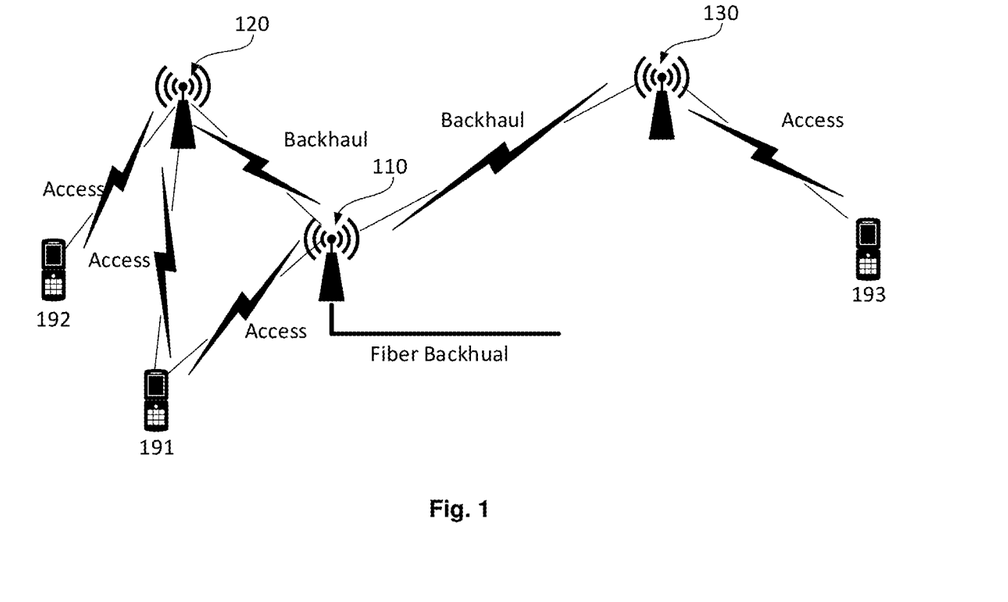
FIG. 1 is a schematic diagram showing an example of an IAB deployment.

Due to a larger bandwidth available to be available for NR (e.g. millimeter wave (mmWave) spectrum) compared to Long Term Evolution (LTE) along with a deployment of massive Multiple Input Multiple Output (MIMO) or multi-beam systems in NR, there is an opportunity to develop and deploy IAB links. The IAB allows easier deployment of a dense network of self-backhauled NR cells in a more integrated manner with control and data channels/procedures defined for providing access to terminal devices (or User Equipments (UEs)). FIG. 1 shows an example of an IAB deployment. As shown, an IAB node (or referred to as Transmitting/Receiving Point (TRP)) 110 has a fiber backhaul and IAB nodes (or TRPs) 120 and 130, which are child IAB nodes of the IAB node 110, are connected to the IAB node 110 via wireless backhaul links. Each IAB node also has access links with terminal devices. As shown, the IAB node 110 has an access link with a UE 191, the IAB node 120 has access links with the UE 191 and a UE 192, and the IAB node 130 has an access link with a UE 193. These access and backhaul links can be multiplexed in time, frequency and/or space (e.g. by means of beam-forming). That is, different backhaul links may operate on the same or different frequencies (also referred to as 'in-band' or 'out-band' relays).

Fingerprinting positioning is a positioning technique that operates by creating a radio reference fingerprint for each point of a fine coordinate grid covering a Radio Access Network (RAN). The reference fingerprint may for example include:
  Cell Identifiers (IDs) that are detected by a terminal device in each grid point;
  Quantized path losses or signal strength measurements, with respect to multiple cells, performed by a terminal device in each grid point; and
  Quantized Timing Advance (TA) in each grid point.
In response to a positioning request, reference fingerprints are first measured, and the corresponding grid point is then looked up and reported. The positioning is performed by comparing signal information of a request fingerprint as received from a terminal device with signal information of the reference fingerprints and returning the location of the best match reference fingerprint.

In the NR scenario, once an IAB node gets access to the network, Radio Resource Management (RRM) measurements for the IAB node, e.g., Synchronization Signal Blocks (SSBs) and Channel State Information—Reference Signals (CSI-RSs), are straightforward options for terminal device positioning. Unlike a terminal device, an IAB node has two functions, i.e., Mobile Termination and Digital Unit. As a Mobile Termination, an IAB node will measure SSBs transmitted from its serving node (parent node) for e.g., serving backhaul link quality monitoring, and measure SSBs transmitted from other IAB nodes for e.g., backup backhaul link discovery and RRM measurement. As a Digital Unit, an IAB node will transmit SSBs to its served UEs and other IAB nodes to allow itself to be discovered and measured.

Conventionally, TA is only measured by a serving cell when a terminal device is synchronized with a network node (e.g., an evolved Node Base (eNB) or gNB) and no additional positioning measurement from neighboring cells is available (except for measurement reports). It is desired to provide a more accurate positioning result for a terminal device in an IAB scenario.

SUMMARY

It is an object of the present disclosure to provide a method and a network device for terminal device positioning with IAB, capable of improving the positioning accuracy in an IAB scenario.

According to a first aspect of the present disclosure, a method in a network device for terminal device positioning with IAB is provided. The method includes: obtaining a node configuration associated with a set of Transmitting/Receiving Points (TRPs); selecting, from the set of TRPs, one or more IAB TRPs associated with a terminal device based on the node configuration and similarity metrics between an initial position estimate and historical positioning results for the terminal device; transmitting a measurement request to a serving TRP associated with the terminal device and each of the one or more IAB TRPs; receiving, from each of the serving TRP and at least one of the one or more IAB TRPs, a measurement report indicating a Timing Advance (TA) associated with that TRP and the terminal device and beam information regarding a beam used for transmission from that TRP to the terminal device; and determining a position of the terminal device based on the measurement reports received from the serving TRP and the at least one IAB TRP.

In an embodiment, the node configuration may indicate IAB topologies for the one or more IAB TRPs.

In an embodiment, the node configuration may be received from an Operation Support System (OSS) or an Access and Mobility Management Function (AMF) entity.

In an embodiment, the similarity metrics man be similarity metrics between a current fingerprint of the terminal device and historical fingerprints of the terminal device.

In an embodiment, the one or more IAB TRPs may be selected based further on histograms of TRP IDs included in Location Service (LCS) requests associated with the historical fingerprints.

In an embodiment, each of the set of TRPs may be associated with a selection priority level dependent on a number of times it has been selected historically.

In an embodiment, for each of the one or more IAB TRPs, from which no measurement report is received, its selection priority level may be lowered or it may be prohibited from being selected subsequently.

In an embodiment, the operation of determining may include: identifying which TRP each measurement report is received from.

In an embodiment, the operation of identifying may be based on a TRP identifier contained in each measurement report.

In an embodiment, the position of the terminal device may be determined by means of triangulation based on the TA in each measurement report and a beam angle derivable from the beam information in each measurement report.

In an embodiment, the position of the terminal device may be determined based on similarity metrics between a fingerprint calculated based on the measurement reports and historical fingerprints of the terminal device.

In an embodiment, the method may further include: updating historical positioning results for the terminal device with the determined position.

In an embodiment, the terminal device positioning may be triggered by a Mobile Terminated (MT) or Mobile Originated (MO) positioning request or a Radio Resource Control (RRC) measurement report.

In an embodiment, the network device may be a Location Management Function (LMF) node.

According to a second aspect of the present disclosure, a network device is provided. The network device includes a communication interface, a processor and a memory. The memory contains instructions executable by the processor whereby the network device is operative to perform the method according to the above first aspect.

According to a third aspect of the present disclosure, a computer readable storage medium is provided. The computer readable storage medium has computer program instructions stored thereon. The computer program instructions, when executed by a processor in a network device, cause the network device to perform the method according to the above first aspect.

With the embodiments of the present disclosure, a node configuration associated with a set of TRPs can be obtained. From the set of TRPs, one or more IAB TRPs associated with a terminal device can be selected based on the node configuration and similarity metrics between an initial position estimate and historical positioning results for the terminal device. A measurement request can be transmitted to a serving TRP associated with the terminal device and each of the one or more IAB TRPs. From each of the serving TRP and at least one of the one or more IAB TRPs, a measurement report indicating a TA associated with that TRP and the terminal device and beam information regarding a beam used for transmission from that TRP to the terminal device can be received. Then, a position of the terminal device can be determined based on the measurement reports received from the serving TRP and the at least one IAB TRP. In other words, the position of the terminal device can be determined based on the TA and beam information associated with not only the serving TRP, but also other IAB TRPs. In this way, a more accurate positioning result for the terminal device can be obtained.

BRIEF DESCRIPTION OF THE DRAWINGS

The above and other objects, features and advantages will be more apparent from the following description of embodiments with reference to the figures, in which.

DETAILED DESCRIPTION

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machineries, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
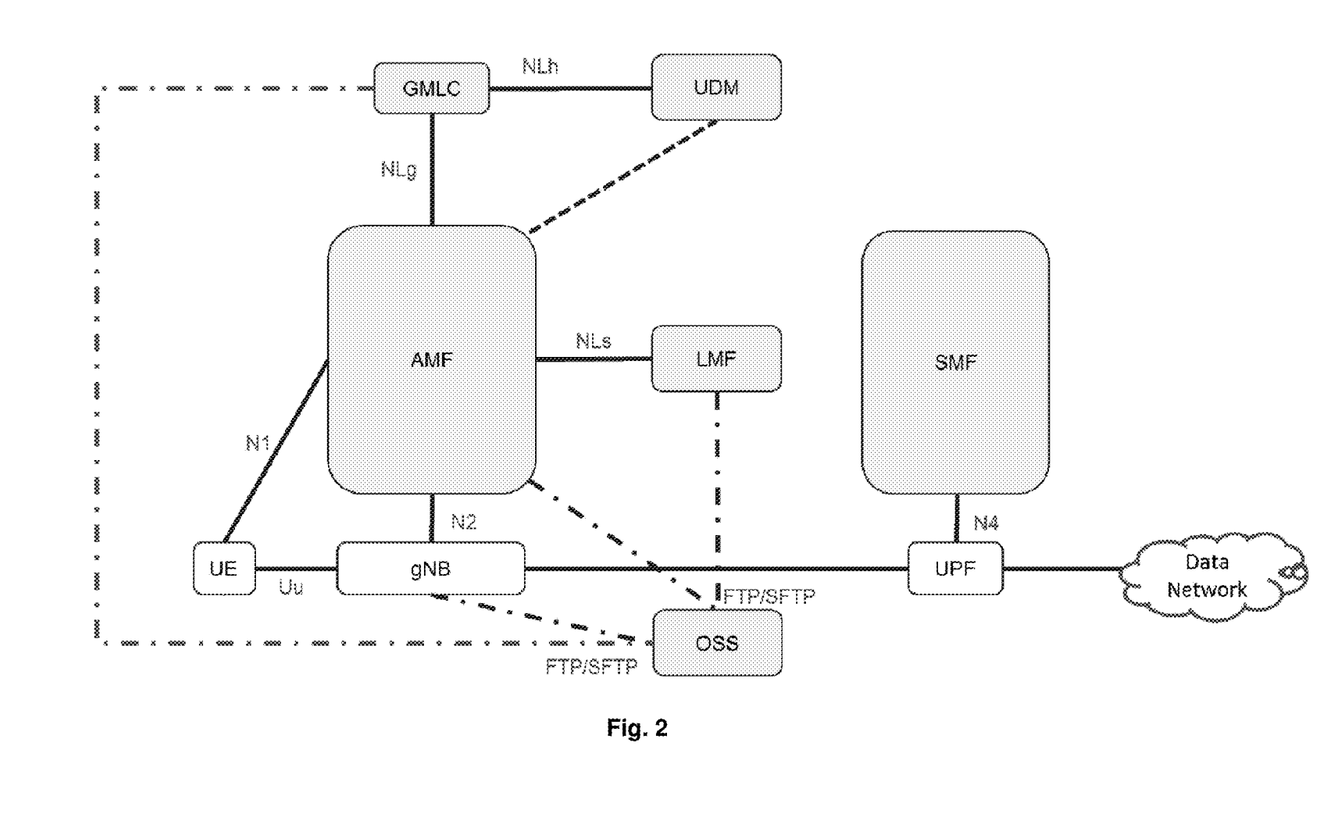
FIG. 2 is a schematic diagram showing a network architecture in which the embodiments of the present disclosure can be applied.

FIG. 2 is a schematic diagram showing a network architecture in which the embodiments of the present disclosure can be applied. The following Network Functions (NFs) are shown in FIG. 2:

Operation Support System (OSS)
Core Access and Mobility Management Function (AMF)
Data network (DN), e.g. operator services, Internet access or 3rd party services
Session Management Function (SMF)
Unified Data Management (UDM)
User plane Function (UPF)
User Equipment (UE)
(Radio) Access Network ((R)AN)
Location Management Function (LMF)
Gateway Mobile Location Center (GMLC).

For details of the NFs and reference points shown in FIG. 2, reference can be made to the $3^{rd}$ Generation Partnership Project (3GPP) Technical Specification (TS) 23.501, V 15.3.0.

In particular, the OSS or AMF can maintain node data (including Parent Nodes, IAB Nodes, Common Nodes, LTE or NR TRP information and Cell Relationship Table CRT), which can be updated when IAB topologies (e.g., Spanning Tree (ST), Directed Acyclic Graph (DAG), or the like) are changed. The LMF can update a local Node Relationship Table (NRT) when the IAB information at the OSS is updated.

An example of an updating message from the OSS or AMF to the LMF is given below in NR and LTE compatible format:

```
Updating Message Content
   SCID/Serving TRP ID: C1 // Serving Cell ID
   Neighboring Node Relationship:
      NC1ID/Nerighboring TRP1 ID: N1 // Neighboring Cell ID
      NC2ID/Neighboring TRP2 ID: N2
      ...
      NC6ID/Neighboring TRP6 ID: N7
   IAB Node Relationship:
      Single-Hop IAB Node
         TRP1 ID: X1
         TRP2 ID: X2...
      Multi-Hop IAB Node: Level 2
         Child TRP1 ID: Y1...
```

An example of an NRT at the LMF is given in Table 1 below:

TABLE 1

Example of NRT at LMF

| IAB Type | SC( ECGI)/ STRPID | NC1ID/ NTRP1ID | NC2ID/ NTRP2ID | NC3ID/ NTRP3ID | ... | NC6ID/ NTRP6ID | IAB Node Level1 (Single hop) | IAB Node Level2 (Multi-hop) | IAB Node Level3 | ... |
|---|---|---|---|---|---|---|---|---|---|---|
| 3 hop | C1 | N11 | N12 | N13 | ... | N16 | X1 | Y1 | Z1 | NA |
| N hop | C2 | N21 | N22 | N23 | ... | N26 | X2 | Y2 | Z2 | Zz2 |
| ... | ... | ... | ... | ... | ...... | ... | ... | ... | ... | |
| 1hop (Single) | C23 | N231 | N232 | N233 | ...... | | X23 | NA | NA | NA |
| Non-IAB | C28 | N281 | N282 | N283 | ... | N286 | NA | NA | NA | NA |

Table 1 shows an example of IAB topologies and neighboring node relationships. For example, it shows a Serving TRP ID (STRPID) and Neighboring TRP IDs (NTRPIDs) for one hop or multi-hop IAB topologies. It also shows IAB nodes at different levels of the IAB topologies.

Figure 3:
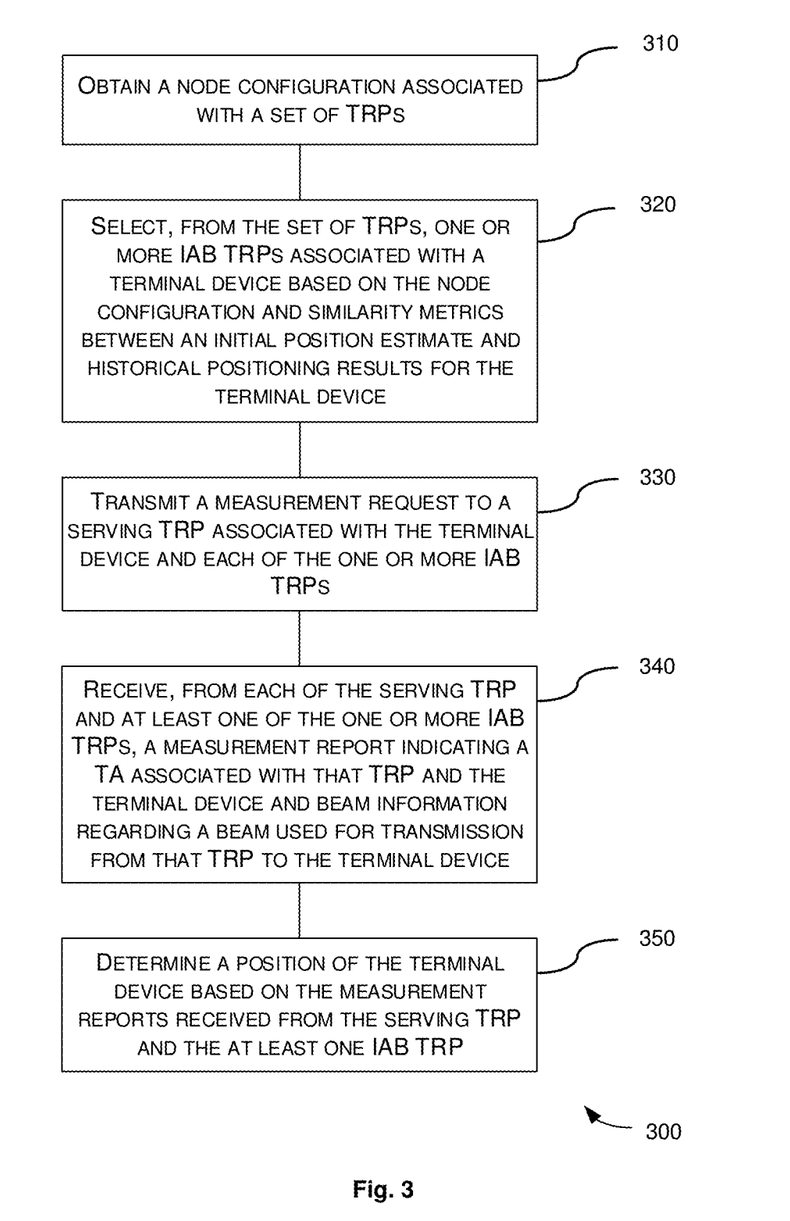
FIG. 3 is a flowchart illustrating a method for terminal device positioning with IAB according to an embodiment of the present disclosure.

FIG. 3 is a flowchart illustrating a method 300 for terminal device positioning with IAB according to an embodiment of the present disclosure. The method 300 can be performed at an LMF node as shown in FIG. 2.

At block 310, a node configuration associated with a set of TRPs can be obtained. For example, the node configuration may indicate neighboring node relationships and/or node topological relationships for the TRPs. The node configuration can be received from an OSS or an AMF entity, as described above in connection with FIG. 2.

At block 320, one or more IAB TRPs associated with a terminal device are selected from the set of TRPs, based on the node configuration and similarity metrics between an initial position estimate and historical positioning results for the terminal device. Here, the node configuration may indicate IAB topologies for the one or more IAB TRPs. In an example, the similarity metrics can be similarity metrics between a current fingerprint of the terminal device and historical fingerprints of the terminal device. In an example, the one or more IAB TRPs can be selected based further on histograms of TRP IDs included in Location Service (LCS) requests associated with the historical fingerprints. In an example, each of the set of TRPs may be associated with a selection priority level dependent on a number of times it has been selected historically.

For example, upon receiving an LCS Request, the LMF node can determine a list of candidate IAB Nodes dynamically based on their similarities with historical positioning results (e.g., latitude, longitude, beam ID, TA, Adaptive Enhanced Cell ID (AECID) and/or Enhanced Cell ID (ECID)). Then, the LMF node can sort the candidate IAB nodes based on their respective selection priority levels, referring to an NRT as described above. A similarity algorithm to be applied to the historical positioning results and the received LCS request may depend on the number of the TRPs and their IDs.

Optionally, machine learning of LCS request similarity based on Bayesian Priori Probability can be applied to select the candidate IAB nodes having the highest probabilities. Based on the similarity with the historical fingerprints, histograms of TRP IDs and signal strengths can be generated, so as to sort the histograms in a descending order and create probabilities of the candidate IAB nodes matched with the LCS request based on accumulated probabilities or Bayesian probabilities. A measurement request can be transmitted to each of the candidate IAB nodes. If no response is received from a specific IAB Node, its selection priority level will be lowered or it will be suspended. The LMF can sort probabilities of fingerprints matched with the LCS request in a descending order and record the best positioning results and their associated TRP IDs. The above steps are repeated for training when another LCS request is received. At the end of the training, histograms of the candidate IAB nodes related to the respective TRP IDs can be sorted in a descending order and the IAB Nodes can be outputted.

At block 330, a measurement request is transmitted to a serving TRP associated with the terminal device and each of the one or more IAB TRPs.

For example, the LMF node can transmit a measurement request Information Element (IE), via NR Positioning Protocol A (NRPPa), to the serving TRP and the IAB TRPs selected in the block 320. The LMF and the AMF may coordinate the same SSB pattern and beam switching pattern of the serving TRP in the IAB scenario, by taking interference cancellation in the access or backhaul procedure into consideration. Upon receiving the measurement request, each TRP can schedule physical resources such as Random Access Channel (RACH) Resource Block (RB), SSB, CSI-RS, Demodulation Reference Signal (DMRS), Sounding Reference Signal (SRS) or the like for measurement.

At block 340, from each of the serving TRP and at least one of the one or more IAB TRPs, a measurement report indicating a TA associated with that TRP and the terminal device and beam information regarding a beam used for transmission from that TRP to the terminal device are received.

For example, messages, such as RRCReconfiguration and RRCReconfigurationComplete, to and from the serving TRP and other IAB TRPs can be distinguished from each other based on a special Medium Access Control (MAC) Control Element (CE) including a bit value corresponding to the TRP ID or a special Physical Resource Block (PRB) position corresponding to the TRP ID. A TA Command MAC CE can be identified by MAC Protocol Data Unit (PDU) sub-header with a Logical Cell ID (LCID). It may have a fixed size of one single octet, including a 2-bit TA Group (TAG) ID and a 6-bit TA Command filed. Alternatively, each TRP may scramble the TA measurement using its TRP ID, which can be explicitly indicated in the RRCReconfiguration message. The terminal device can take measurements via RRC Configuration and return measurement result, including (Reference Signal Received Power (RSRP), Reference Signal Received Quality (RSRQ), Signal to Interference plus Noise Ratio (SINR), Beam ID, SSB index, etc.) to each TRP. In other word, the terminal device can measure the same SSB pattern from different TRPs and report the measurement result to each TRP. Each TRP can receive the measurement result from the terminal device, measure the TA associated with the TRP and the terminal device based on the measurement result, and provide the TA via NRPPa to the LMF node together with the measurement result from the terminal device.

In an example, for each of the one or more IAB TRPs, from which no measurement report is received, its selection priority level can be lowered or it can be prohibited from being selected subsequently.

At block 350, a position of the terminal device is determined based on the measurement reports received from the serving TRP and the at least one IAB TRP.

In an example, in the block 350, the network node can identify which TRP each measurement report is received from. For example, this can be done based on a TRP ID contained in each measurement report, as described above.

Figure 4:
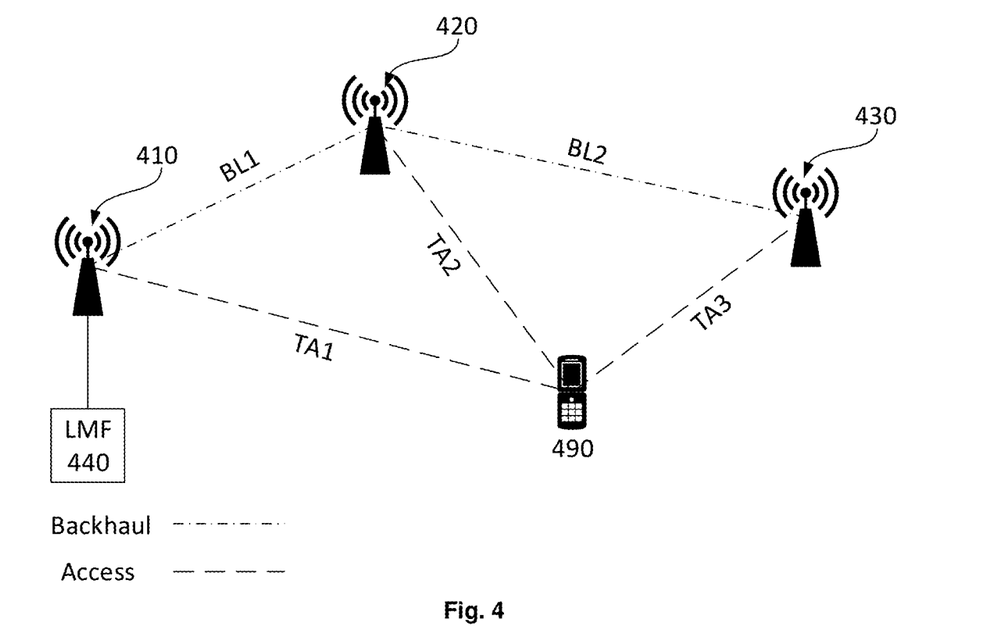
FIG. 4 is a schematic diagram showing an example of an IAB scenario in which the embodiments of the present disclosure can be applied.

FIG. 4 shows an example of an IAB scenario. As shown in FIG. 4, a serving TRP 410 of a terminal device 490 has a backhaul link, BL1, with its child IAB node, a TRP 420, which in turn has a backhaul link, BL2, with its child IAB node, a TRP 430. The serving TRP 410 measures a TA, TA1, with respect to the terminal device 490 and reports it to the LMF node 440. Similarly, the TRP 420 measures a TA, TA2, with respect to the terminal device 490 and the TRP 430 measures a TA, TA3, with respect to the terminal device 490. TA2 is reported from the TRP 420 to the TRP 410 and then forwarded to the LMF node 440. TA3 is reported from the TRP 430 to the TRP 420 and then forwarded to the TRP 410 and finally to the LMF node 440. That is, TA1, TA2 and TA3 are received at the LMF node 440. In order to distinguish these TAs from one another, the LMF node 440 may consider the multiplexing scheme between the backhaul links BL1 and BL2. For example, when a Frequency Division Multiplexing (FDM) scheme is used, transmissions over BL1 and BL2 can be synchronized in time domain and thus the reports of TA1, TA2 and TA3 can readily be distinguished from each other at the LMF node 440. When a Time Division Multiplexing (TDM) or Spatial Division Multiplexing (SDM) scheme is used, the transmissions over BL1 and BL2 may not be synchronized in time domain and thus the reports of TA1, TA2 and TA3 may contain TRP IDs of the TRPs 410, 420 and 430 such that the LMF node 440 can distinguish them from one another.

In an example, in the block 350, the position of the terminal device can be determined by means of triangulation based on the TA in each measurement report and a beam angle derivable from the beam information in each measurement report. Additionally or alternatively, in the block 350, the position of the terminal device can be determined based on similarity metrics between a fingerprint calculated based on the measurement reports and historical fingerprints of the terminal device.

For example, the LMF node can obtain historical fingerprints and calculate a fingerprint based on the received measurement reports. Then, the LMF node can calculate a similarity between the calculated fingerprint and the historical fingerprints, using the TAs and beam information from the serving TRP and the at least one IAB TRP. According to the traditional ECID/AECID method, fingerprint generation and position matching only involve coarse-grained similarity, including the TA and signal strength from only the serving cell. However, according to an embodiment of the present disclosure, SSB beam sweeping and beam IDs provide additional angle information relative to reference TRP directions, which facilitates positioning based on an Angle of Arrival (AOA) method. Further, the TAs from more than one TRP provide distance metrics from different reference TRP locations, which in turn provides a fine-grained fingerprint. The LMF node can calculate an accurate ECID/AECID result with this fine-grained fingerprint.

Figure 5:
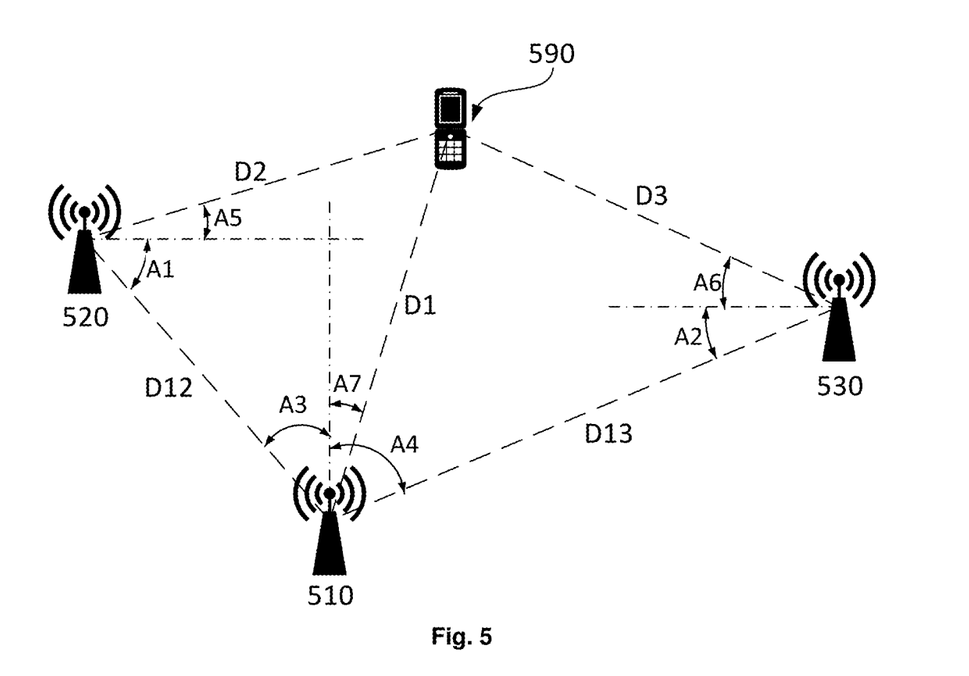
FIG. 5 is a schematic diagram showing an example of terminal device positioning by means of triangulation based on TAs and beam angles.

FIG. 5 shows an example of terminal device positioning by means of triangulation based on TAs and beam angles. In this example, it is assumed that a serving TRP 510 measures a TA, TA1, with respect to a terminal device 590, an IAB TRP measures a TA, TA2, with respect to the terminal device 590, and an IAB TRP measures a TA, TA3, with respect to the terminal device 590. Accordingly, the distance D1 between the serving TRP 510 and the terminal device 590 can be calculated as D1=TA1*Du, where Du denotes a distance unit corresponding a basic time granularity in a communication system. For example, in LTE, one unit of TA corresponds to 16 Ts and 1 Ts=3*$10^8$*1/(15000*2048))/2≈4.89 m, thus Du≈78 m. Similarly, the distance D2 between the IAB TRP 520 and the terminal device 590 can be calculated as D2=TA2*Du and the distance D3 between the IAB TRP 530 and the terminal device 590 can be calculated as D3=TA3*Du. The distance D12 between the serving TRP 510 and the IAB TRP 520 and the distance D13 between the serving TRP 510 and the IAB TRP 530 are known. The angles A1, A2, A3 and A4 are known as well and the angles A5, A6 and A7 are beam angles with respect to a horizontal or vertical line that can be derived from the beam information from the respective TRPs. With all the above knowledge, the position of the terminal device 590 can be determined at a high accuracy.

In an example, the method 300 can further include: updating historical positioning results for the terminal device with the determined position.

In an example, the terminal device positioning in the method 300 can be applied in an active positioning procedure in which it can be triggered by a Mobile Terminated (MT) or Mobile Originated (MO) positioning request. In this case, the initial position estimate and/or current fingerprint of the terminal device in the block 320 can be obtained from the positioning request.

Alternatively, the terminal device positioning in the method 300 can be applied in a passive positioning procedure in which it can be triggered by a Radio Resource Control (RRC) measurement report. Passive positioning is to passively receive various events for a defined set or all subscribers/devices from network nodes like Evolved Packet System (EPS), 5G Next-generation Core (5GNC) and/or Radio Access Network (RAN) OSS in a mobile network, and derive locations of these subscribers/devices from the events. The events are not specifically and necessarily for positioning purpose but are triggered by normal user activities in the network, e.g. attach/detach, handover etc., which enables an "always-on" effect as the events are continuously generated if the subscribers/devices are connected to the network. Typical use cases for passive positioning include, for example: large scale apps, mobility analytics, smart city & urban planning, footfall analysis, mobile advertisement, Geo-fencing services and location-based alerts. RAN Passive Location refers to a case in which passive locations are calculated based on the events from a radio network, which may include e.g. RRC messages. Compared to the events from the core network which (usually) merely contain serving cell ID of the subscriber/device that contributes to the location estimation, the events from the radio network may contain richer information including neighboring cells, signal strength, timing advances where positioning methods like ECID or fingerprinting positioning as described above may apply to generate a more accurate location estimation.

In connection with the above method 300, the following IE extensions can be made to the 3GPP TS 38.455 NR Positioning Protocol A (NRPPa).

IAB Node Configuration

The purpose of the IAB Node Configuration element is to provide the IAB capabilities and configuration of IAB of serving cell.

| IE/Group Name | Presence | Range | IE Type and Reference | Semantics Description |
|---|---|---|---|---|
| Max IAB Node Level | M | | INTEGER (0 . . . 128) | |
| IAB Node Level1 numbers | M | | INTEGER (0 . . . 128) | |
| IAB Node Level1 Cell ID | M | | INTEGER (1 . . . 15, . . .) | |
| >CHOICE IAB Cell Information Item | M | | | |
| >>PCI EUTRA | M | | INTEGER (0 . . . 503, . . .) | Physical Cell ID of the reported E-UTRA cell. |
| >>CGI EUTRA | M | | 9.2.7 | Cell Global Identifier of the E-UTRA cell. |
| >>TAC | M | | 9.2.11 | Tracking Area Code |
| >>EARFCN | M | | INTEGER (0 . . . 262143, . . .) | Corresponds to $N_{DL}$ for FDD and $N_{DL/UL}$ for TDD in ref. TS 36.104 [7]. |
| >>Number of Antenna Ports EUTRA | M | | ENUMERATED(n1-or-n2, n4, . . .) | Number of used antenna ports, where n1-or-n2 corresponds to 1 or 2 ports, n4 corresponds to 4 ports |
| IAB Node Level1 Cell ID | O | | INTEGER (1 . . . 15, . . .) | |
| >CHOICE IAB Cell Information Item | M | | | |
| >>PCI EUTRA | M | | INTEGER (0 . . . 503, . . .) | Physical Cell ID of the reported E-UTRA cell. |
| >>CGI EUTRA | M | | 9.2.7 | Cell Global Identifier of the E-UTRA cell. |
| >>TAC | M | | 9.2.11 | Tracking Area Code |
| >>EARFCN | M | | INTEGER (0 . . . 262143, . . .) | Corresponds to $N_{DL}$ for FDD and $N_{DL/UL}$ for TDD in ref. TS 36.104 [7], |
| >>Number of Antenna Ports EUTRA | M | | ENUMERATED(n1-or-n2, n4, . . .) | Number of used antenna ports, where n1-or-n2 corresponds to 1 or 2 ports, n4 corresponds to 4 ports |
| IAB Node Level2numbers | O | | NTEGER (0 . . . 128) | |
| IAB Node Level1 Cell ID | O | | INTEGER (1 . . . 15, . . .) | |
| . . . | | | | |
| IAB Node LevelN numbers | O | | NTEGER (0 . . . 128) | |
| . . . | O | | . . . | |

IAB Node Results

The purpose of the IAB Node Results element is to provide the IAB the results of IAB Node Configuration.

| IE/Group Name | Presence | Range | IE Type and Reference | Semantics Description |
|---|---|---|---|---|
| IAB Node Results | | | | Included if IAB cells are measured |
| >>IAB Cell Level | O | | | |
| >>IAB Cell ID | O | | | |
| >>IAB Cell TAC | O | | | |
| >>Parent Cell ID | O | | | |
| >>NG-RAN Access Point Position | O | | | |

E-CID MEASUREMENT INITIATION REQUEST

This message is sent by LMF to initiate E-CID measurements.

Direction: LMF→NG-RAN node.

| IE/Group Name | Presence | Range | IE type and reference | Semantics description | Criticality | Assigned Criticality |
|---|---|---|---|---|---|---|
| Messaqe Type | M | | 9.2.3 | | YES | reject |
| NRPPa Transaction ID | M | | 9.2.4 | | — | |
| LMF UE Measurement ID | M | | INTEGER (1 . . . 15, . . .) | | YES | reject |
| Report Characteristics | M | | ENUMERATED (OnDemand, Periodic, . . .) | | YES | reject |
| Measurement Periodicity | C-ifReportCharacteristicsPeriodic | | ENUMERATED (120 ms, 240 ms, 480 ms, 640 ms, 1024 ms, 2048 ms, 5120 ms, 10240 ms, 1 min, 6 min, 12 min, 30 min, 60 min, . . .) | | YES | reject |
| Measurement Quantities | | 1 . . . <maxnoMeas> | | | EACH | reject |
| >Measurement Quantities Item | M | | ENUMERATED (Cell-ID, Angle of Arrival, Timing Advance Type 1, Timing Advance Type 2, RSRP, RSRQ, . . .) | | — | — |
| Other-RAT Measurement Quantities | | 0 . . . <maxnoMeas> | | | EACH | ignore |
| >Other-RAT Measurement Quantities Item | M | | ENUMERATED (GERAN, UTRAN, . . .) | | | |
| WLAN Measurement Quantities | | 0 . . . <maxnoMeas> | | | EACH | ignore |
| >WLAN Measurement Quantities Item | M | | ENUMERATED (WLAN, . . .) | | — | |
| IAB Node Config | O | | | | | |

E-CID MEASUREMENT INITIATION RESPONSE

This message is sent by NG-RAN node to indicate that the requested E-CID measurement is successfully initiated.

Direction: NG-RAN node→LMF.

| IE/Group Name | Presence | Range | IE type and reference | Semantics description | Criticality | Assigned Criticality |
|---|---|---|---|---|---|---|
| Messaqe Type | M | | 9.2.3 | | YES | reject |
| NRPPa Transaction ID | M | | 9.2.4 | | — | |
| LMF UE Measurement ID | M | | INTEGER (1 . . . 15, . . .) | | YES | reject |
| RAN UE Measurement ID | M | | INTEGER (1 . . . 15, . . .) | | YES | reject |
| E-CID Measurement Result | O | | 9.2.5 | | YES | iqnore |
| Criticality Diagnostics | O | | 9.2.2 | | YES | ignore |
| Cell Portion ID | O | | 9.2.12 | | YES | ignore |
| Other-RAT Measurement Result | O | | 9.2.13 | | YES | ignore |
| WLAN Measurement Result | O | | 9.2.14 | | YES | ignore |

E-CID Measurement Result

The purpose of the E-CID Measurement Result information element is to provide the E-CID measurement result.

In an embodiment, the similarity metrics man be similarity metrics between a current fingerprint of the terminal device and historical fingerprints of the terminal device.

| IE/Group Name | Presence | Range | IE Type and Reference | Semantics Description |
|---|---|---|---|---|
| Serving Cell ID | M | | NG-RAN CGI 9.2.6 | NG-RAN Cell Identifier of the serving cell |
| Serving Cell TAC | M | | TAC 9.2.11 | Tracking Area Code of the serving cell |
| NG-RAN Access Point Position | O | | 9.2.10 | The configured estimated geographical position of the antenna of the cell. |
| Measured Results | | 0 . . . <maxnoMeas> | | |
| >CHOICE Measured Results Value | M | | | |
| Measured Results | | | | |
| >CHOICE Measured Results Value | M | | | |
| >>Value Angle of Arrival EUTRA | M | | | |
| >>Value Timing Advance Type 1 EUTRA | M | | | |
| >>Value Timing Advance Type 2 EUTRA | M | | | |
| >>Result RSRP EUTRA . . . | . . . | | | |
| >>Result RSRQ EUTRA . . . | . . . | | | |
| IAB Node Results | O | | | Included if IAB cells are measured |
| Measured Results | | | | |
| >CHOICE Measured Results Value | M | | | |
| >>Value Angle of Arrival EUTRA | M | | | |
| >>Value Timing Advance Type 1 EUTRA | M | | | |
| >>Value Timing Advance Type 2 EUTRA | M | | | |
| >>Result RSRP EUTRA . . . | . . . | | | |
| >>Result RSRQ EUTRA . . . | . . . | | | |
| IAB Node Results | O | | | Included if IAB cells are measured |
| Measured Results | | | | |
| >CHOICE Measured Results Value | M | | | |
| >>Value Angle of Arrival EUTRA | M | | | |
| >>Value Timing Advance Type 1 EUTRA | M | | | |
| >>Value Timing Advance Type 2 EUTRA | M | | | |
| >>Result RSRP EUTRA . . . | . . . | | | |
| >>Result RSRQ EUTRA . . . | . . . | | | |
| IAB Node Results | O | | | Included if IAB cells are measured |
| . . . | | | | |

Figure 6:
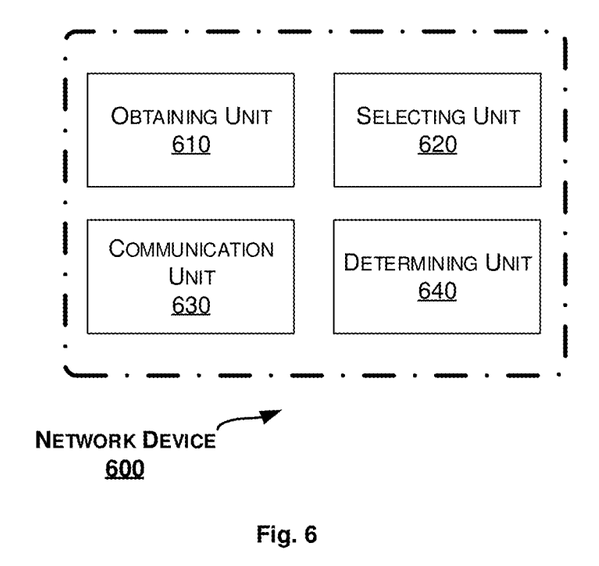
FIG. 6 is a block diagram of a network device according to an embodiment of the present disclosure.

Correspondingly to the method 300 as described above, a network device is provided. FIG. 6 is a block diagram of a network device 600 according to an embodiment of the present disclosure. The network device 600 can be an LMF node.

As shown in FIG. 6, the network device 600 includes an obtaining unit 610 configured to obtaining a node configuration associated with a set of TRPs. The network device 600 further includes a selecting unit 620 configured to select, from the set of TRPs, one or more IAB TRPs associated with a terminal device based on the node configuration and similarity metrics between an initial position estimate and historical positioning results for the terminal device. The network device 600 further includes a communication 630 configured to transmit a measurement request to a serving TRP associated with the terminal device and each of the one or more IAB TRPs and receive, from each of the serving TRP and at least one of the one or more IAB TRPs, a measurement report indicating a TA associated with that TRP and the terminal device and beam information regarding a beam used for transmission from that TRP to the terminal device. The network device 600 further includes a determining unit 640 configured to determine a position of the terminal device based on the measurement reports received from the serving TRP and the at least one IAB TRP.

In an embodiment, the node configuration may indicate IAB topologies for the one or more IAB TRPs.

In an embodiment, the node configuration may be received from an Operation Support System (OSS) or an Access and Mobility Management Function (AMF) entity.

In an embodiment, the one or more IAB TRPs may be selected based further on histograms of TRP IDs included in Location Service (LCS) requests associated with the historical fingerprints.

In an embodiment, each of the set of TRPs may be associated with a selection priority level dependent on a number of times it has been selected historically.

In an embodiment, for each of the one or more IAB TRPs, from which no measurement report is received, its selection priority level may be lowered or it may be prohibited from being selected subsequently.

In an embodiment, the determining unit 640 can be configured to identify which TRP each measurement report is received from.

In an embodiment, the operation of identifying may be based on a TRP identifier contained in each measurement report.

In an embodiment, the position of the terminal device may be determined by means of triangulation based on the TA in each measurement report and a beam angle derivable from the beam information in each measurement report.

In an embodiment, the position of the terminal device may be determined based on similarity metrics between a fingerprint calculated based on the measurement reports and historical fingerprints of the terminal device.

In an embodiment, the network device 600 may further include an updating unit configured to update historical positioning results for the terminal device with the determined position.

In an embodiment, the terminal device positioning may be triggered by a Mobile Terminated (MT) or Mobile Originated (MO) positioning request or a Radio Resource Control (RRC) measurement report.

The units 610~640 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 7:
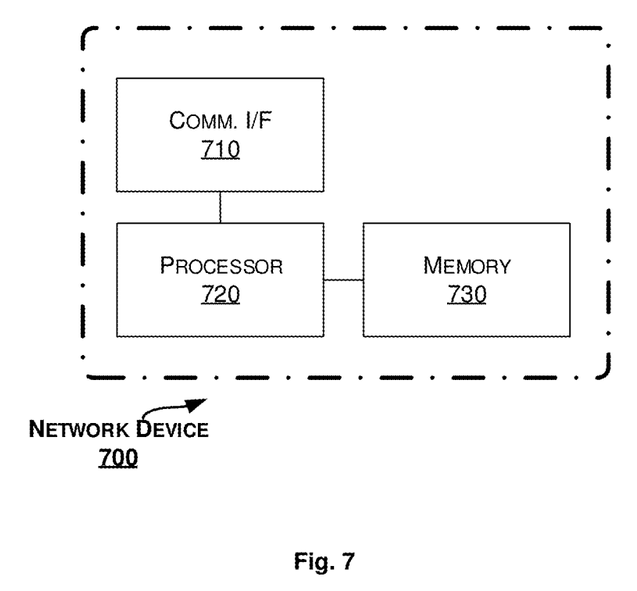
FIG. 7 is a block diagram of a network device according to another embodiment of the present disclosure.

FIG. 7 is a block diagram of a network device 700 according to another embodiment of the present disclosure. The network device 700 can be an LMF node.

The network device 700 includes a communication interface 710, a processor 720 and a memory 730. The memory 730 contains instructions executable by the processor 720 whereby the network device 700 is operative to perform the actions, e.g., of the procedure described earlier in conjunction with FIG. 3. Particularly, the memory 730 contains instructions executable by the processor 720 whereby the network device 700 is operative to: obtain a node configuration associated with a set of TRPs; select, from the set of TRPs, one or more IAB TRPs associated with a terminal device based on the node configuration and similarity metrics between an initial position estimate and historical positioning results for the terminal device; transmit a measurement request to a serving TRP associated with the terminal device and each of the one or more IAB TRPs; receive, from each of the serving TRP and at least one of the one or more IAB TRPs, a measurement report indicating a TA associated with that TRP and the terminal device and beam information regarding a beam used for transmission from that TRP to the terminal device; and determine a position of the terminal device based on the measurement reports received from the serving TRP and the at least one IAB TRP.

In an embodiment, the node configuration may indicate IAB topologies for the one or more IAB TRPs.

In an embodiment, the node configuration may be received from an Operation Support System (OSS) or an Access and Mobility Management Function (AMF) entity.

In an embodiment, the similarity metrics man be similarity metrics between a current fingerprint of the terminal device and historical fingerprints of the terminal device.

In an embodiment, the one or more IAB TRPs may be selected based further on histograms of TRP IDs included in Location Service (LCS) requests associated with the historical fingerprints.

In an embodiment, each of the set of TRPs may be associated with a selection priority level dependent on a number of times it has been selected historically.

In an embodiment, for each of the one or more IAB TRPs, from which no measurement report is received, its selection priority level may be lowered or it may be prohibited from being selected subsequently.

In an embodiment, the operation of determining may include: identifying which TRP each measurement report is received from.

In an embodiment, the operation of identifying may be based on a TRP identifier contained in each measurement report.

In an embodiment, the position of the terminal device may be determined by means of triangulation based on the TA in each measurement report and a beam angle derivable from the beam information in each measurement report.

In an embodiment, the position of the terminal device may be determined based on similarity metrics between a fingerprint calculated based on the measurement reports and historical fingerprints of the terminal device.

In an embodiment, the memory 730 may further contain instructions executable by the processor 720 whereby the network device 700 is operative to: update historical positioning results for the terminal device with the determined position.

In an embodiment, the terminal device positioning may be triggered by a Mobile Terminated (MT) or Mobile Originated (MO) positioning request or a Radio Resource Control (RRC) measurement report.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 720 causes the network device 700 to perform the actions, e.g., of the procedure described earlier in conjunction with FIG. 3.

The computer program product may be configured as a computer program code structured in computer program modules. The computer program modules could essentially perform the actions of the flow illustrated in FIG. 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device for terminal device positioning with Integrated Access Backhaul, IAB, comprising:

obtaining a node configuration associated with a set of Transmitting/Receiving Points, TRPs;

selecting, from the set of TRPs, one or more IAB TRPs associated with a terminal device based on the node configuration and similarity metrics between an initial position estimate and historical positioning results for the terminal device, the similarity metrics being similarity metrics between a current fingerprint of the terminal device and historical fingerprints of the terminal device;

transmitting a measurement request to a serving TRP associated with the terminal device and each of the one or more IAB TRPs;

receiving, from each of the serving TRP and at least one of the one or more IAB TRPs, a measurement report indicating a Timing Advance, TA, associated with that TRP and the terminal device and beam information regarding a beam used for transmission from that TRP to the terminal device; and determining a position of the terminal device based on the measurement reports received from the serving TRP and the at least one IAB TRP.

2. The method of claim 1, wherein the node configuration indicates IAB topologies for the one or more IAB TRPs.

3. The method of claim 1, wherein the node configuration is received from an Operation Support System, OSS, or an Access and Mobility Management Function, AMF, entity.

4. The method of claim 1, wherein the one or more IAB TRPs are selected based further on histograms of TRP IDs included in Location Service, LCS, requests associated with the historical fingerprints.

5. The method of claim 1, wherein each of the set of TRPs is associated with a selection priority level dependent on a number of times it has been selected historically.

6. The method of claim 5, wherein for each of the one or more IAB TRPs, from which no measurement report is received, its selection priority level is lowered or it is prohibited from being selected subsequently.

7. The method of claim 1, wherein said determining comprises: identifying which TRP each measurement report is received from.

8. The method of claim 7, wherein said identifying is based on a TRP identifier contained in each measurement report.

9. The method of claim 1, wherein the position of the terminal device is determined by means of triangulation based on the TA in each measurement report and a beam angle derivable from the beam information in each measurement report.

10. The method of claim 1, wherein the position of the terminal device is determined based on similarity metrics between a fingerprint calculated based on the measurement reports and historical fingerprints of the terminal device.

11. The method of claim 1, further comprising:
updating historical positioning results for the terminal device with the determined position.

12. The method of claim 1, wherein the terminal device positioning is triggered by a Mobile Terminated, MT, or Mobile Originated, MO, positioning request or a Radio Resource Control, RRC, measurement report.

13. The method of claim 1, wherein the network device is a Location Management Function, LMF, node.

14. A network device comprising a communication interface, a processor and a memory, the memory comprising instructions executable by the processor whereby the network device is operative to perform the method according to claim 1.

15. A non-transitory computer readable storage medium having computer program instructions stored thereon, the computer program instructions, when executed by a processor in a network device, causing the network device to perform the method according to claim 1.

16. A method in a network device for terminal device positioning with Integrated Access Backhaul, IAB, comprising:

obtaining a node configuration associated with a set of Transmitting/Receiving Points, TRPs;

selecting, from the set of TRPs, one or more IAB TRPs associated with a terminal device based on the node configuration and similarity metrics between an initial position estimate and historical positioning results for the terminal device;

transmitting a measurement request to a serving TRP associated with the terminal device and each of the one or more IAB TRPs;

receiving, from each of the serving TRP and at least one of the one or more IAB TRPs, a measurement report indicating a Timing Advance, TA, associated with that TRP and the terminal device and beam information regarding a beam used for transmission from that TRP to the terminal device; and determining a position of the terminal device based on the measurement reports received from the serving TRP and the at least one IAB TRP, the position of the terminal device being determined based on similarity metrics between a fingerprint calculated based on the measurement reports and historical fingerprints of the terminal device.

* * * * *